United States Patent [19]

Rowe

[11] 4,274,566
[45] * Jun. 23, 1981

[54] VEHICLE DRINKING APPARATUS

[76] Inventor: V. Lopez Rowe, 2680 Saturn Ave., Huntington Park, Calif. 90255

[*] Notice: The portion of the term of this patent subsequent to Jun. 20, 1995, has been disclaimed.

[21] Appl. No.: 38,628

[22] Filed: May 14, 1979

[51] Int. Cl.³ .............................................. B62J 11/00
[52] U.S. Cl. ..................................... 224/35; 222/610; 224/148; 280/289 R
[58] Field of Search ................... 280/289 R; 180/727, 180/769; 239/33; 222/74, 527, 530, 175, 608–610; 224/148, 30 R, 30 A, 35, 36, 39, 273–275, 311, 312

[56] References Cited

U.S. PATENT DOCUMENTS

| | | | |
|---|---|---|---|
| 581,767 | 5/1897 | Powers | 239/33 |
| 2,002,777 | 5/1935 | Johnson | 222/530 X |
| 3,840,153 | 10/1974 | Devlin | 224/32 R X |
| 4,095,812 | 6/1978 | Rowe | 224/32 R X |

Primary Examiner—Stephen Marcus
Attorney, Agent, or Firm—Lawrence Fleming

[57] ABSTRACT

This is an improvement in the subject of my prior U.S. Pat. No. 4,095,812, and relates to an apparatus installable on a bicycle or other vehicle to enable the rider to drink water or other liquid while riding and without distracting his attention. A flexible drinking tube is retained on an improved retracting reel mechanism in a housing preferably attached to the upper horizontal frame member of a bicycle. The tube is continuous, with no rotary joints. The fixed inner end of the flexible tube is connected to a rigid or semi-rigid supply tube which extends into a water bottle mounted separately from the reel housing. In the improved retracting reel mechanism, the flexible drinking tube passes around two spaced sheaves. One sheave is guided for displacement in translation against the urging of a tension spring. When the rider pulls out the mouthpiece end of the drinking tube, this sheave moves linearly in the manner of a block-and-tackle to a degree, e.g., half the extension of the drinking tube. When the mouthpiece is released, the spring, via this sheave, automatically retracts the drinking tube. The axis of the other sheave is preferably fixed at an angle to permit the tube to clear the frame member. A check valve at the submerged end of the supply tube operates to keep the tubing system full of liquid.

4 Claims, 4 Drawing Figures

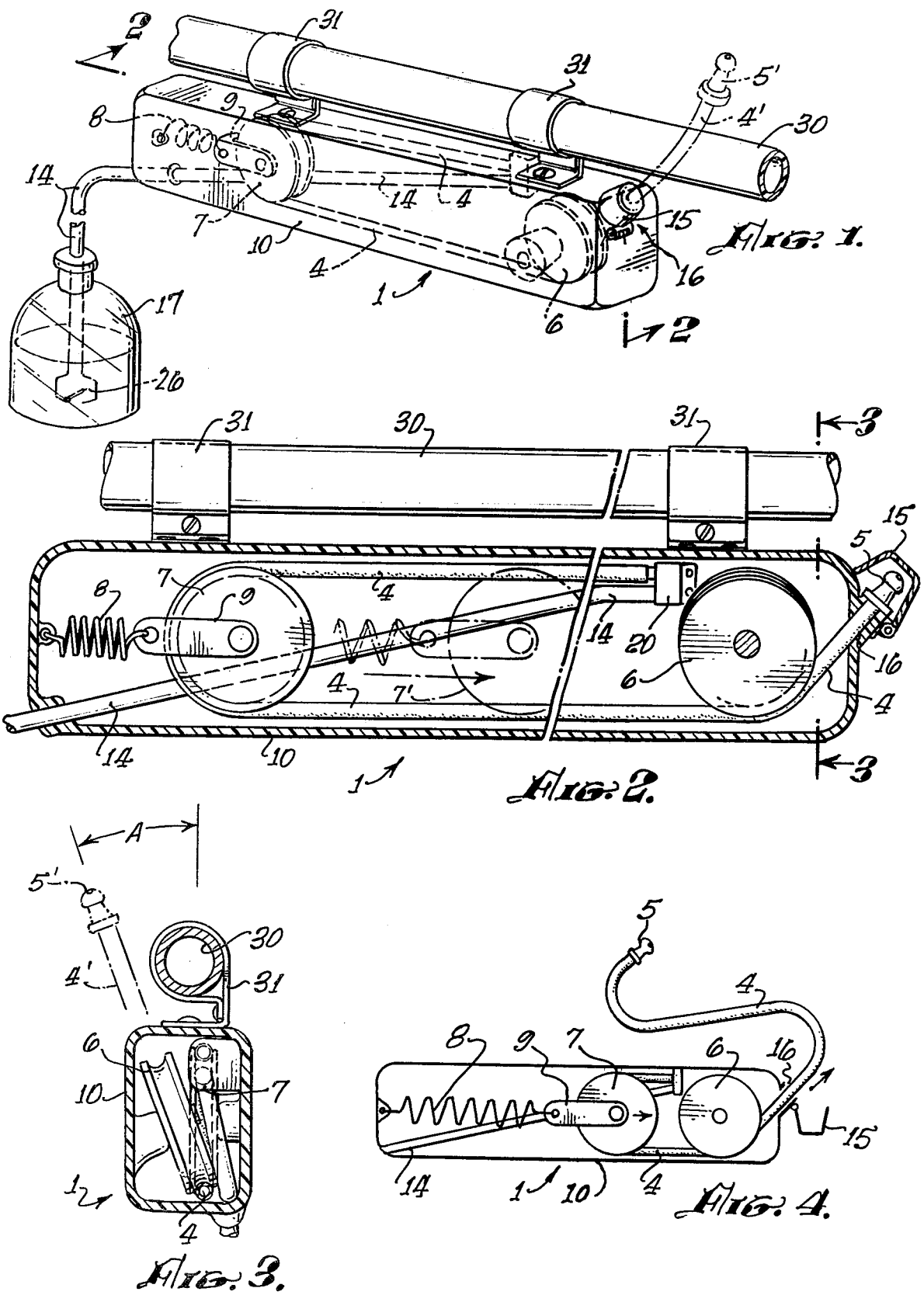

VEHICLE DRINKING APPARATUS

BACKGROUND

On bicycles, motorcycles, and the like, it is desirable to provide convenient means, operable with one hand without groping or looking, to quench the rider's thirst while riding. Such means are also desirable on wheel chairs. My prior U.S. Pat. No. 4,095,812 shows forms of apparatus for doing this, using a retractable suction tube or drinking straw.

The only other prior art of which I am aware that shows drinking apparatus of this nature is a U.S. patent to Powers, No. 581,767, of 1897.

Other U.S. Pat. Nos. showing forms of hose and tube reel means related to the present invention are:
Shope 1,940,720
Erickson 2,896,659.
These relate to air and gasoline hoses. The above is the closest prior art of which I am aware.

BRIEF DESCRIPTION

A flexible drinking tube with a mouthpiece is retained on an improved retracting reel means in a housing which is adapted to be mounted on a bicycle, at a point where the mouthpiece is easily reached by the rider. The apparatus may also be mounted on a motorcycle or the like, or on a wheel chair. On a bicycle, the housing is preferably mounted just under the top horizontal frame member.

The tubing is continuous, without any sliding rotary joints. The fixed inner end of the flexible drinking tube, which may be of rubber or plastic material, is preferably connected inside the housing to a rigid or semi-rigid supply line that extends out of the housing to a water bottle or container mounted separately on the vehicle. At the submerged end of the supply tube inside the bottle is a check valve to prevent the liquid from running back into the bottle, and so keep the tube full.

When the rider pulls out the outer mouthpiece end of the drinking tube to drink, the tube is thus full of water. The absence of sliding rotary joints helps to prevent leakage which might empty part of the tubing.

The improved retracting reel means employs two sheaves. The shaft of the first sheave, adjacent the mouthpiece end of the housing, is fixed; the shaft of the second sheave is guided for displacement in linear translation against the urging of a spring. When the flexible drinking tube, which passes over both sheaves, is pulled out for drinking, both sheaves rotate, and it draws the second sheave linearly toward the first sheave in the manner of a block and tackle. If the drinking tube passes once over each sheave, the linear displacement of the second sheave is, of course, half that of the mouthpiece; if it passes around twice, the displacement ratio is one-fourth. One-half is usually enough, since the required extension of the tube is typically of the order of 40 cm, and 20 cm of displacement of the second sheave may be accommodated in a housing of convenient length.

In a preferred form, the housing is elongated and is mounted with suitable clamps under and parallel to the top horizontal frame member of a bicycle. The drinking tube comes out of an opening at the upper front portion of the housing, to one side of the tubular frame member in order to clear it. The fixed axis of the first sheave is preferably inclined to place the rim of the sheave in line with the opening. A hinged sanitary cap preferably covers the mouthpiece when the drinking tube is retracted.

DETAILED DESCRIPTION

In the drawing:
FIG. 1 is a perspective view, partly diagrammatic, of a complete apparatus;
FIG. 2 is a section on line 2—2 of FIG. 1;
FIG. 3 is a section on line 3—3 of FIG. 2; and
FIG. 4 is a diagrammatic side view showing the tube extended.

In FIGS. 1-3, the reel, tubing, and housing assembly, indicated generally at 1, is shown mounted under a tubular frame member 30, which is preferably the upper horizontal frame member of a bicycle. Suitable mounting clamps are indicated at 31, 31. The flexible drinking tube 4 with attached mouthpiece 5 is shown partly extended in broken lines at 4', 5' in FIGS. 1 and 3, and is shown retracted in FIG. 2. A hinged sanitary cap or the like 15, preferably attached to the housing 10, FIG. 2, preferably covers the mouthpiece 5 when it is retracted.

The flexible drinking tube 4 passes over two pulleys or sheaves 6, 7. The first sheave 6 is adjacent the mouthpiece end of the housing 10, its shaft fixed to the housing. The second sheave 7 is free to move in translation against the urging of a tension spring 8 via a suitable yoke or the like means 9, FIGS. 1, 2, and 4. Referring particularly to FIG. 4, when drinking tube 4 is pulled out of its opening 16 in housing 10, it pulls sheave 7 linearly to the right, toward fixed sheave 6. When the drinking tube 4 is released, spring 8 acts to pull the second sheave 7 back toward the left, drawing the drinking tube 4 back into the housing 10 to its retracted position.

The opening 16 is located to one side of the center of housing 10 in order to clear the frame member 30, FIG. 1. Referring to FIG. 3, the plane of the first sheave 6 is inclined at an angle A to the vertical plane of the second sheave 7, the lower rim portions of both sheaves being in line. This disposition of sheave 6 permits the path of the tube 4 to be aligned both with the two sheaves and with the opening 16.

Referring to FIG. 2, the drinking tube 4 preferably terminates inside housing 10 at a suitable fixed fitting 20. From this point, a rigid or semi-rigid supply tube 14 is preferably run out the back of housing 10 to a liquid container or bottle 17, FIG. 1, of any suitable construction, mounted elsewhere on the bicycle or other vehicle. Since its location is most practicably lower than that of the housing 10, it is desirable to provide a suitable check valve 26 in container 17 to keep the drinking tube system full of liquid, so that the user does not have to apply prolonged suction to get a drink. Check valve 26, indicated schematically in the drawing by a conventional symbol, may be of any suitable conventional type, disposed to check the flow of liquid into the container but permit flow out, toward the mouthpiece.

In the present appratus, the tubing is continuous from the mouthpiece 5 to the container 17 without rotary or sliding joints, and so has the advantages of freedom from leaks, low operating friction in extension and retraction of the drinking tube, reliability, and low cost.

I claim:
1. A drinking apparatus for the rider of a two-wheeled vehicle, comprising:
    a container for a potable liquid and means to attach said container to said vehicle;

retracting reel means in an elongated narrow housing and means to attach said housing to said vehicle near said rider;

a flexible drinking tube with a mouthpiece and retractably retained in said reel means for convenient manual withdrawal by said rider; and a supply tube connected non-rotatably to said drinking tube and extending into said container to provide a continuous conduit from said container to said mouthpiece, said reel means having only two sheaves, a first sheave on a fixed shaft and a second sheave supported tor linear translation of its axis toward and away from said first sheave, and further comprising a spring means urging said second sheave away from said first sheave, said drinking tube passing over both said sheaves and being manually pullable out from an opening in the end portion of said housing, said spring means automatically retracting said drinking tube when it is released.

2. An apparatus as in claim 1, wherein:

said housing is adapted to be clamped parallel to and under a top horizontal frame member of a bicycle, and said opening is located off-center to clear said frame member, and the plane of said first sheave is inclined to the vertical with its lower portion generally in line with said second sheave and its upper portion generally in line with said opening.

3. An apparatus as in claims 1 or 2, further comprising:

a check valve means at the end portion of said supply tube below the surface of said liquid in said container and adapted to keep both said tubes full of liquid.

4. An apparatus as in claims 2 or 3, further comprising:

a sanitary cap hinged to said housing at said opening to cover said mouthpiece when said drinking tube is retracted.

* * * * *